United States Patent [19]

Anderson

[11] Patent Number: 5,442,910
[45] Date of Patent: Aug. 22, 1995

[54] REACTION MOTOR STRUCTURE AND METHOD OF CONSTRUCTION

[75] Inventor: William G. Anderson, Lancaster, Pa.

[73] Assignee: Thermacore, Inc., Lancaster, Pa.

[21] Appl. No.: 215,427

[22] Filed: Mar. 21, 1994

[51] Int. Cl.⁶ ............................................. F02K 11/00
[52] U.S. Cl. ..................................................... 60/266
[58] Field of Search ..................... 60/267, 266, 271; 165/104.26, 47

[56] References Cited

U.S. PATENT DOCUMENTS

| | | |
|---|---|---|
| 2,956,399 | 10/1960 | Beighley . |
| 3,043,103 | 7/1962 | Dent et al. . |
| 3,077,073 | 2/1963 | Kuhrt . |
| 3,230,613 | 1/1966 | Rechin et al. . |
| 3,267,599 | 8/1966 | Laux . |
| 3,710,572 | 1/1973 | Herud . |
| 3,719,046 | 3/1973 | Sutherland et al. ................... 60/267 |
| 3,913,666 | 10/1975 | Bayliss . |
| 4,516,631 | 5/1985 | Russell ..................................... 165/47 |
| 4,890,454 | 1/1990 | Schmidt et al. . |
| 5,167,117 | 12/1992 | Herzog et al. . |
| 5,178,514 | 1/1993 | Damiral . |

*Primary Examiner*—Timothy S. Thorpe
*Attorney, Agent, or Firm*—Martin Fruitman

[57] ABSTRACT

The apparatus is a cooling structure for reaction engine throats. The constriction in the throat is cooled by a group of heat pipes which radiate outward from the constriction to a larger diameter perimeter surface where the heat is dissipated. The entire structure can be constructed by embedding pretested heat pipes around a base structure with plasma sprayed metal.

4 Claims, 1 Drawing Sheet

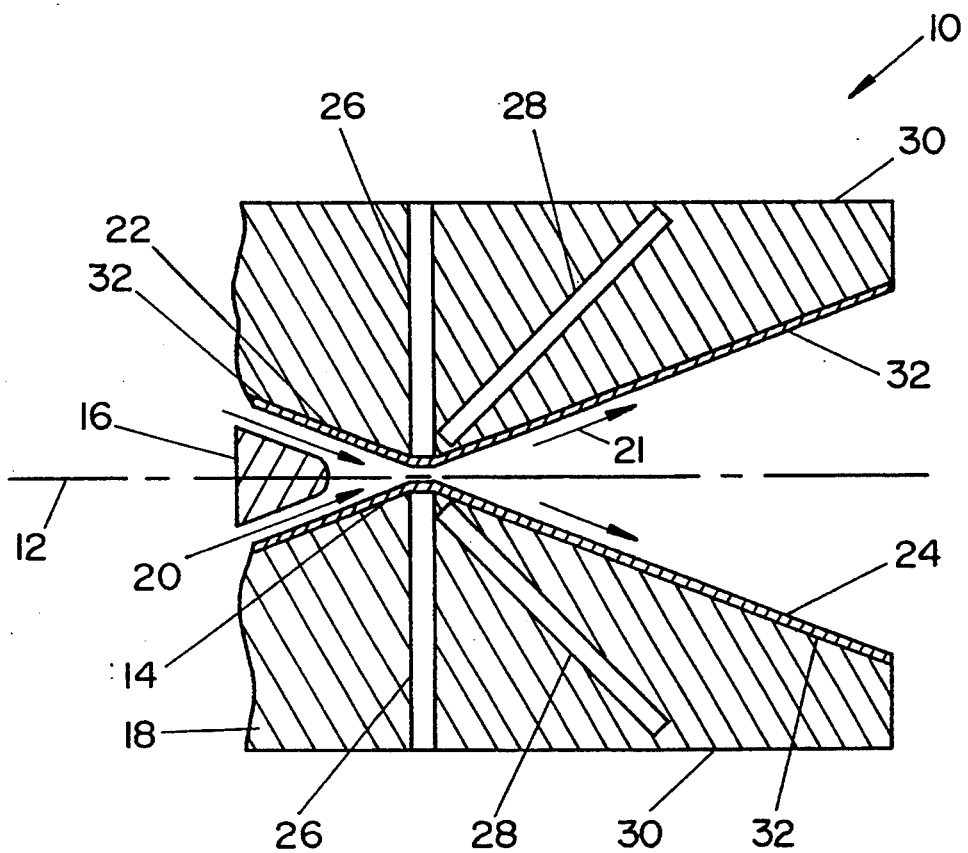

REACTION MOTOR STRUCTURE AND METHOD OF CONSTRUCTION

BACKGROUND OF THE INVENTION

This invention relates generally to reaction motors and more specifically to a throat structure for arcjet thruster and other reaction engines which includes heat pipes for cooling the throat.

The constriction of the throat of an arc jet or rocket engine produces a particularly difficult problem in cooling. The heat of such a device is concentrated at the narrow throat, and the very configuration of such a throat reduces the surface area available for heat dissipation. Moreover, the temperatures at the throat are very high so that specific materials are needed to withstand the temperatures without adverse effects.

Arcjet thruster engines have even more severe requirements. Although the general configuration of the throat is similar to that of more conventional rockets, the arcjet thruster operates on the basis of an electrical arc heating incoming gases and thereby expanding the gases to such a degree that they leave the throat with a force which provides thrust. The materials at the throat must therefore be suitable to maintain the electric arc and not be destroyed by the arc. Unlike old arc lamp projectors or electric welding systems, an arcjet thruster engine can not include consumable electrodes, so the cooling system must be effective enough to maintain temperatures which prevent erosion of the electrodes.

Prior art cooling arrangements have treated rocket throats like any other cooling problem. Most such throats have been constructed with corrugated walls, coils of tubing, or annular chambers immediately adjacent to the throat to form a heat exchanger through which liquids or gas are pumped to cool the throat. Some arrangements use the rocket fuel itself as the coolant. Other systems include U.S. Pat. No. 3,077,073 by Kuhrt which converts a liquid fuel into gas within such an annular heat exchanger, and U.S. Pat. No. 5,178,514 which uses heat pipes oriented annularly within the shroud ring of a gas turbine engine.

However, all of these prior art heat exchangers still include one limitation which has not been effectively overcome. The remaining problem is the limited area around a rocket throat available to transfer heat from the rocket throat to the heat exchanger. Since all prior art heat transfer systems are dependent on the surface area immediately around the rocket throat to remove heat from the throat, the small size of the throat limits the ability to remove heat, and therefore causes increased temperatures at the throat.

This problem is even more severe for an arcjet thruster engine in which a typical throat can be less than 25 mm in diameter and the order of one millimeter long. All the heat within such an engine is therefore being generated in a space approximately the size of a penny, with only the area of the edge of a penny through which to transfer the heat. Regardless of the material or coolant used, the temperature gradient which results from such a small area of heat transfer can be very severe.

SUMMARY OF THE INVENTION

The present invention solves the problem of the limited heat transmission area of a rocket throat by dramatically increasing the effective area for heat transfer without changing the size of the rocket throat itself.

This seeming paradox is accomplished by the use of heat pipes which are located with their ends adjacent to the rocket throat and oriented so that they extend radially outward from the throat. Such a configuration transmits the heat from the throat with virtually no temperature gradient between the ends of the heat pipes at the rocket throat and the ends of the heat pipes located at a heat exchanger at considerably greater radius out from the rocket throat. The larger radius at the far ends of the heat pipes thereby provides a greater surface area for transfer of heat than is available at the rocket throat, and the outer surface itself can be used as a heat dissipation surface or a heat exchanger can be attached to the outer surface. In either case, the heat pipes provide a lower temperature at the rocket throat.

The radially oriented heat pipes can include more than one set. For instance, two or more sets of heat pipes can radiate out from the rocket throat, with the heat pipes of each set also diverging from each other as they radiate out from the rocket throat. The groups of heat pipes thereby form planar or conical shapes which fan out from the rocket throat.

Since the rocket throat is subjected to severe forces, it must be structurally sound. In order to maintain the structural integrity of the rocket throat, the apparatus of the invention is installed without substantial modification of the basic structure of the rocket throat. To accomplish this, the heat pipes of the invention are located within the solid body of the rocket throat, and a particular method of constructing the configuration is used.

Essentially, the body of the rocket throat is built up around the heat pipes. The heat pipes are first temporarily attached to a thin throat form which is the shape of the rocket throat by using jigs to hold the heat pipes in place. The throat form is basically two truncated cones on a common axis with the cones joined at their smaller ends to form the throat, and the heat pipes are oriented so that one end of each heat pipe is located at or near the junction between the cones. The other end of each heat pipe is located at a point more remote from the common axis of the cones than the first end. The structure is a skeleton similar in appearance to the structure of the ribs of an umbrella, with the rocket throat located at the center of the umbrella, and each rib representing a heat pipe.

The body of the rocket throat is then formed around the skeleton of the throat form and the heat pipes by plasma spraying metal around the throat form and the heat pipes. The sprayed metal forms a solid body which encloses the skeleton and tightly bonds the heat pipes to the throat form and each other.

This method of construction provides a dramatic advantage over methods which form one or more heat pipes within an existing structure, because it permits the construction and prior testing of a standard heat pipe which can be manufactured in quantity. The operation of the rocket throat is therefore not dependent upon the success of the construction of heat pipes which are built into it after construction of the throat. The present invention's method of construction permits the verification of proper heat pipe operation before the rocket throat is constructed around the heat pipes, and the plasma spraying has little possibility of affecting the operation of the pretested heat pipes.

The present invention thereby furnishes a reaction engine throat structure which is more effectively cooled than any previous engine throats, and also furnishes a method of construction of such a throat which yields a less costly and more reliable structure.

BRIEF DESCRIPTION OF THE DRAWING

The FIGURE is a cross section view of an arcjet thruster engine taken along the axis of the throat structure.

DETAILED DESCRIPTION OF THE INVENTION

The FIGURE is a cross section view of arcjet thruster engine 10 taken along axis 12 of throat 14. Engine 10 operates by establishing an electrical arc between cathode 16 and anode 18 which heats incoming gas 20 entering at input cone 22. Incoming gas 20 is dramatically expanded within throat 14 and therefore exits as expanded gas 21 through output cone 24 providing the thrust of engine 10.

Anode 18 is typically constructed of tungsten metal in an arcjet thruster engine because tungsten is highly suitable for generation of the required electrical arc, and because tungsten is also suitable for the extremely high temperatures in throat 14. Tungsten is also a suitable metal for conventionally fueled reaction engines, but other metals such as Inconel, an alloy of niobium with 1.0 percent zirconium, rhenium, or coated copper are also used for such applications.

As discussed previously, the cooling of throat 14 is a difficult problem which can be solved by the inclusion of heat pipes 26 and 28 within the body of anode 18 which also determines the shape of throat 14. Each of the heat pipes extends outward from the region of throat 14 to the outside surface 30 of anode 18, from which location heat can be radiated, or to which a heat exchanger (not shown) can be attached.

Heat pipes 26 are located with one end near throat 14 and are oriented to extend away from throat 14 on radii transverse to common axis 12 of throat 14, input cone 22 and output cone 24. Heat pipes 28 are also placed with one end near throat 14 and they also extend away from throat 14, but in an angular orientation, so that they are positioned on a conical locus whose apex is within throat 14. Although only two heat pipes in each set 26 and 28 are seen in the FIGURE, heat pipes 26 and 28 are located all the way around throat 14 to form fan like configurations. Moreover, additional configurations of heat pipes can be included within any reaction engine. A third set of heat pipes oriented in the direction opposite to heat pipes 28 so that they form a shape similar to input cone 22, would be particularly easy to add in engine 10.

In a typical 10 kW arcjet thruster engine, the total heat flux produced in anode 18 is 1925 watts. This heat can be removed satisfactorily using only ten heat pipes, each carrying 200 watts. Such pipes are constructed with tungsten casings which are ⅛ inch in diameter, have a wall thickness of 0.015 inch, and are two inches long. They include conventional tungsten screen wick structures and use lithium as the heat transfer medium.

Engine 10 shown in the FIGURE can be constructed in a very suitable manner by the use of plasma sprayed metal to build up the body of anode 18 and to bond heat pipes 26 and 28 within anode 18 as it is being built up.

The construction is begun by constructing a base structure 32 which can be made of thin sheet metal shaped in a form to determine the combined shapes of input cone 22, throat 14 and output cone 24. Such a structure can also be constructed by spraying metal onto a removable mandrel. All the heat pipes to be included in the engine, having been constructed and pretested, are initially supported by a construction jig in the desired orientation or temporarily wired in place. Metal, tungsten metal for the arcjet thruster engine, is then sprayed onto base structure 32 and heat pipes 26 and 28. This sprayed tungsten covers base structure 32 and the heat pipes and bonds them into a single body.

One method of locating angularly oriented heat pipes such as heat pipes 28 is to first build up a conical body to the thickness needed to support heat pipes 28 in the orientation shown, and then to hold the heat pipes in place around the built up cone by tying wire around them. Subsequent metal spraying bonds the heat pipes to the previously built cone, and the inclusion of the wire in the structure has no deleterious effect.

The bonding of the heat pipes to base structure 32 or to previously built up sprayed metal is accomplished by using conventional vacuum plasma spray technology. In that process, hydrogen and argon gas mixtures are ionized into a plasma. Metal powder is injected into the high temperature plasma and the molten particles formed are propelled onto the surface to be covered, where they solidify to form layers. The bonding of one layer atop another builds up the thickness of the structure.

The structure of the invention thereby furnishes a reaction engine throat which is cooled to a substantially uniform temperature to prevent material damage. Without such effective cooling, very high thermal stresses can be generated near the throat, because the high temperature material at the throat can not expand radially due to the cooler outer regions. This can generate stress levels which are above the yield strength of material and severely damage the throat.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, metals other than tungsten and heat pipes of different sizes and configurations may be used.

What is claimed and for which Letters patent of the United States are desired to be secured is:

1. A reaction motor structure comprising:
   a solid body which includes a through hole with two open ends and a throat of smaller cross section area than either open end and located between the two open ends; and
   at least two elongated, non-annular heat pipes embedded within the body so that the space between heat pipes is filled with solid material and oriented so that a first evaporator end of each heat pipe is located adjacent to the throat and a condenser at the opposite end of each heat pipe is located radially more remote from the through hole than the first evaporator end.

2. The reaction motor of claim 1 wherein the open ends and the throat of the through hole have a common axis.

3. The reaction motor of claim 1 wherein the throat is cylindrical in shape and has a central axis and the heat pipes are oriented so that they extend away from the axis of the throat on radii transverse to the cylindrical throat.

4. The reaction motor of claim 1 wherein the body is constructed by spraying metal around at least two operational heat pipes held in position around a base structure which determines the through hole and the throat.

* * * * *